April 1, 1969  R. E. RICE  3,435,904
ROTARY CULTIVATOR

Filed July 5, 1966  Sheet 1 of 2

INVENTOR
RUSSELL E. RICE

ATT'Y

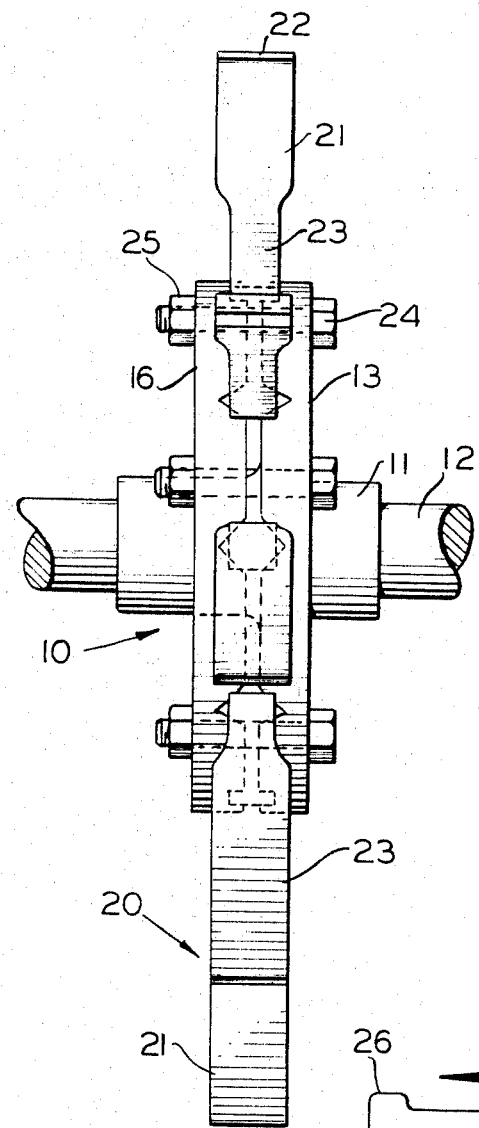
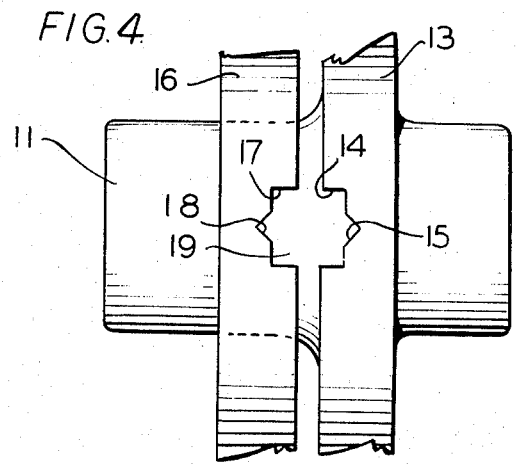
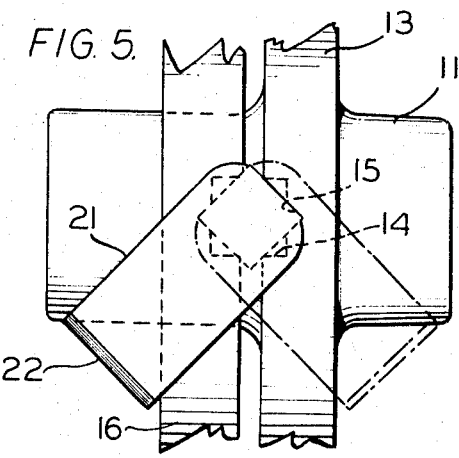
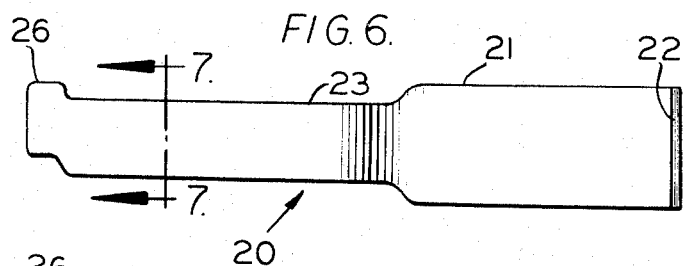
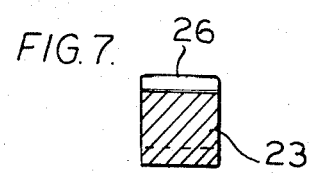

United States Patent Office 3,435,904
Patented Apr. 1, 1969

3,435,904
ROTARY CULTIVATOR
Russell E. Rice, Stockton, Calif., assignor to International Harvester Company, Chicago, Ill., a corporation of Delaware
Filed July 5, 1966, Ser. No. 562,728
Int. Cl. A01b *23/02, 21/02*
U.S. Cl. 172—556                4 Claims

ABSTRACT OF THE DISCLOSURE

An agricultural implement of the rotary hoe type, having adjustable and replaceable teeth for breaking up, loosening and cultivating the soil.

---

This invention relates to earthworking implements and particularly to wheels or spiders for rotary hoes and the like.

An object of the invention is the provision of an improved construction of toothed wheel for earthworking implements.

Another object of the invention is the provision of an improved hoe wheel or spider having teeth optionally projectable therefrom generally radially in the plane of the wheel or at any angle thereto.

Other objects and advantages of the invention will become clear from the following detailed description when read in conjunction with the accompanying drawings, wherein:

FIGURE 3 is an enlarged end elevation of the structure shown in FIGURE 1;

FIGURE 4 is an enlarged detail of a portion of the toothed wheel of this invention;

FIGURE 5 is a view similar to FIGURE 4 showing optional positions of the teeth;

FIGURE 6 is a detail showing one of the teeth separated from the body of the wheel; and FIGURE 7 is a section taken on the line 7—7 of FIGURE 6.

Figure 1:
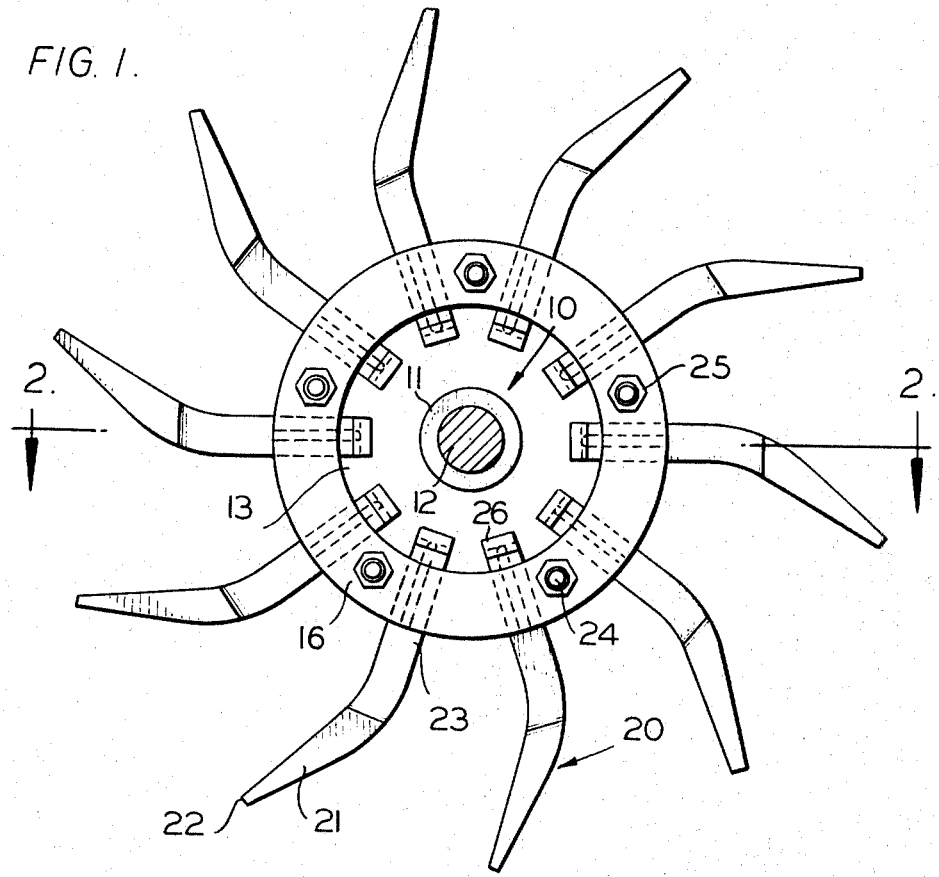
FIGURE 1 is a view in side elevation of a toothed wheel embodying the features of this invention.

In the drawings the numeral 10 designates a hub having an axially elongated bearing portion 11 adapted to be mounted upon a shaft 12, and a web portion 13. The web 13 is provided with a plurality of circumferentially spaced, radially directed rectangularly shaped channels or grooves 14, and the base of each groove 14 is provided with a radially extending V-shaped notch or groove 15.

Also forming a part of the toothed wheel of this invention is an annular member in the form of a ring 16 having formed therein circumferentially spaced, radially extending rectangularly shaped channels or grooves 17, the base of each said groove 17 having formed therein a V-shaped notch 18. Ring 16 mates with web 13, and grooves 14 and 17 are adapted to register to form generally radially extending openings 19.

The rotary hoe wheel of this invention includes a plurality of spikes or teeth 20, each of which includes a broadened radially outer portion 21 sharpened at its tip to provide an earth penetrating edge 22, and a radially inner mounting section 23, generally square in cross-section, as indicated in FIGURE 7, for reception in one of the openings 19 formed by the opposed and registering grooves 14 and 17.

The square inner end 23 of each tooth is firmly seated in grooves 14 and 17 and ring 16 affixed to web 13 by the provision of bolts 24, received in circumferentially spaced registering openings in the web and ring, and nuts 25.

Each tooth 20 is locked against radial displacement from its associated opening 19 by upsetting the inner end of the tooth to form an axially projecting shoulder 26 overlapping the inner periphery 27 of the annulus or ring 16.

Figure 2:
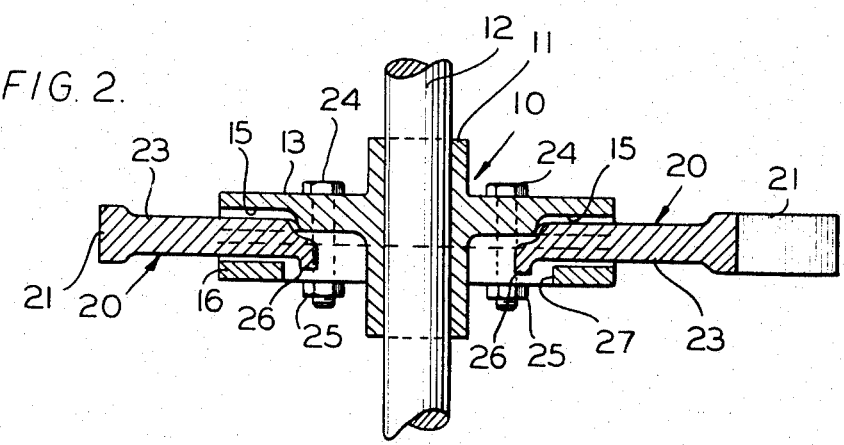
FIGURE 2 is a section taken on the line 2—2 of FIGURE 1.

As indicated in FIGURES 1, 2, and 3, when the squared inner portion 23 of the tooth is seated in grooves 14 and 17, the outer portion 21 of each tooth is bent in the plane of the wheel. More aggressive engagement of the spikes or teeth 20 with the soil is achieved by optionally disposing the teeth diagonally or at an angle to the plane of the wheel and to either side thereof, as indicated by the solid and dotted line positions in FIGURE 5. This is accomplished by loosening bolts 24 and rotating each tooth 45°. The sides of each of the grooves 15 and 18 are disposed at an angle of 90° to receive opposite apices of the square inner portion, 23 of the tooth, the other apices being received in the space between the ring and web, whereupon bolts 24 and nuts 25 are again tightened to hold each tooth firmly in position. Although all of the teeth 20 are preferably adjusted to the optional positions of FIGURE 5 with all of the teeth extending diagonally from one side of the wheel if desired, alternate teeth may be adjusted ot extend diagonally from opposite sides of the plane of the wheel.

It is believed that the construction and operation of the novel toothed wheel of this invention will be clearly understood from the foregoing description.

What is claimed is:

1. In a rotary cultivator wheel a hub including an axially extending bearing portion and a radially projecting web portion, said web portion having a plurality of circumferentially spaced generally rectangular generally radially extending peripherally opening grooves therein, a ring having generally rectangular grooves therein facing and complementing the grooves in said web portion to form radially extending peripheral openings disposed in the plane of the wheel, a plurality of generally radially projecting teeth, each tooth having an inner portion of generally rectangular section terminating in a substantially linear end, said inner portion receivable in and having a seat in one of said openings and an outer ground engaging portion bent generally in the plane of the wheel in one position of said tooth, and each of said grooves having recesses therein forming another generally rectangular seat angularly displaced from and adapted to optionally receive said inner portion of said tooth to optionally dispose said tooth at an angle to the plane of the wheel.

2. The invention set forth in claim 1, wherein means are provided for securing said ring to said web portion with the inner end of each of said teeth projecting radially inwardly of said ring.

3. The invention set forth in claim 2, wherein the inner ends of said teeth are deformed to prevent radial displacement thereof from the wheel.

4. The invention set forth in claim 3, wherein the inner end of each of said teeth has an axially outwardly extending projection intersecting the plane of said ring.

References Cited

UNITED STATES PATENTS

| 2,028,365 | 1/1936 | Wangelin | 172—556 |
| 2,419,717 | 4/1947 | Karl | 172—556 |
| 2,864,298 | 12/1958 | Toland | 172—556 |

ABRAHAM G. STONE, *Primary Examiner.*
R. C. HARRINGTON, *Assistant Examiner.*